Jan. 21, 1947.  E. J. ISBISTER  2,414,469
DISTANCE AND DIRECTION MEASURING APPARATUS
Filed March 8, 1940  3 Sheets-Sheet 1

INVENTOR
ERIC J. ISBISTER,
BY
Herbert H. Thompson
his ATTORNEY

Jan. 21, 1947.  E. J. ISBISTER  2,414,469
DISTANCE AND DIRECTION MEASURING APPARATUS
Filed March 8, 1940  3 Sheets-Sheet 2
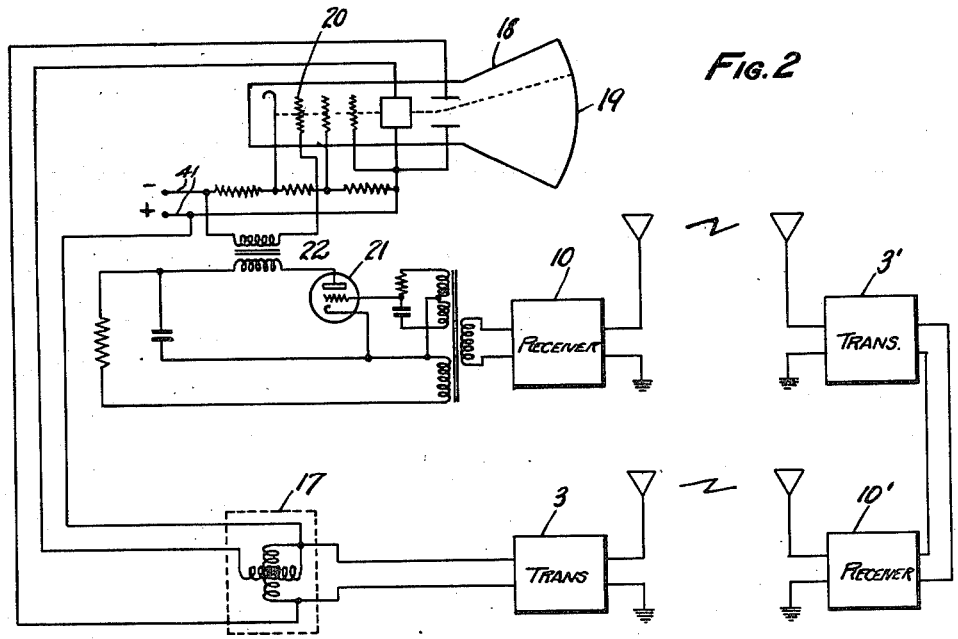
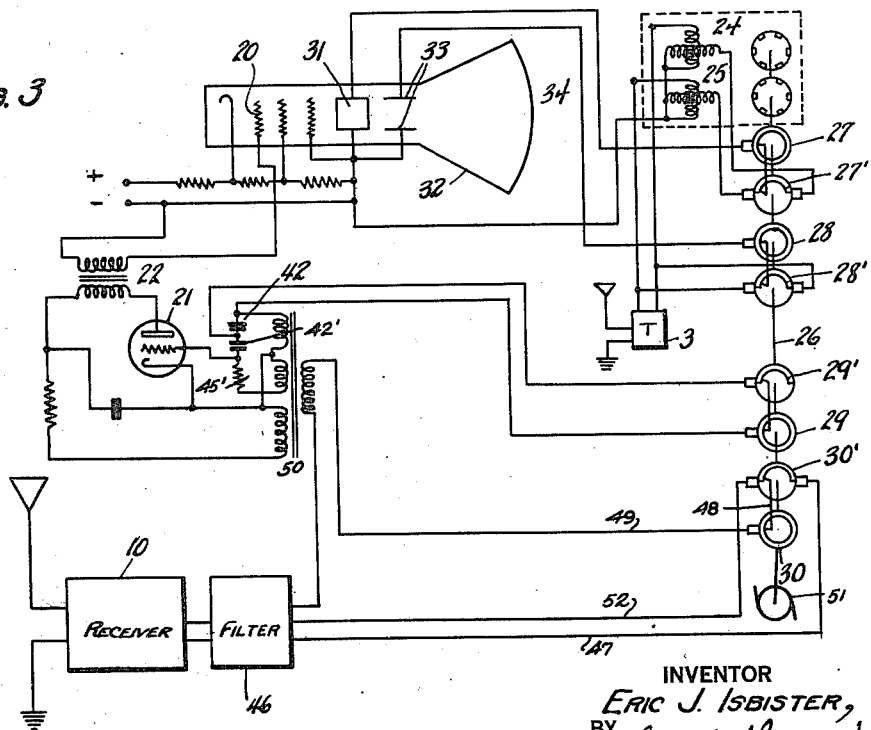
INVENTOR
*Eric J. Isbister,*
BY
*Herbert H. Thompson*
his ATTORNEY Jan. 21, 1947.  E. J. ISBISTER  2,414,469
DISTANCE AND DIRECTION MEASURING APPARATUS
Filed March 8, 1940  3 Sheets-Sheet 3
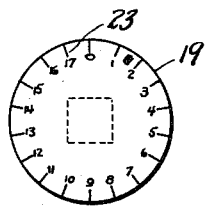
FIG. 4
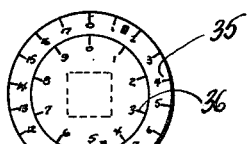
FIG. 5
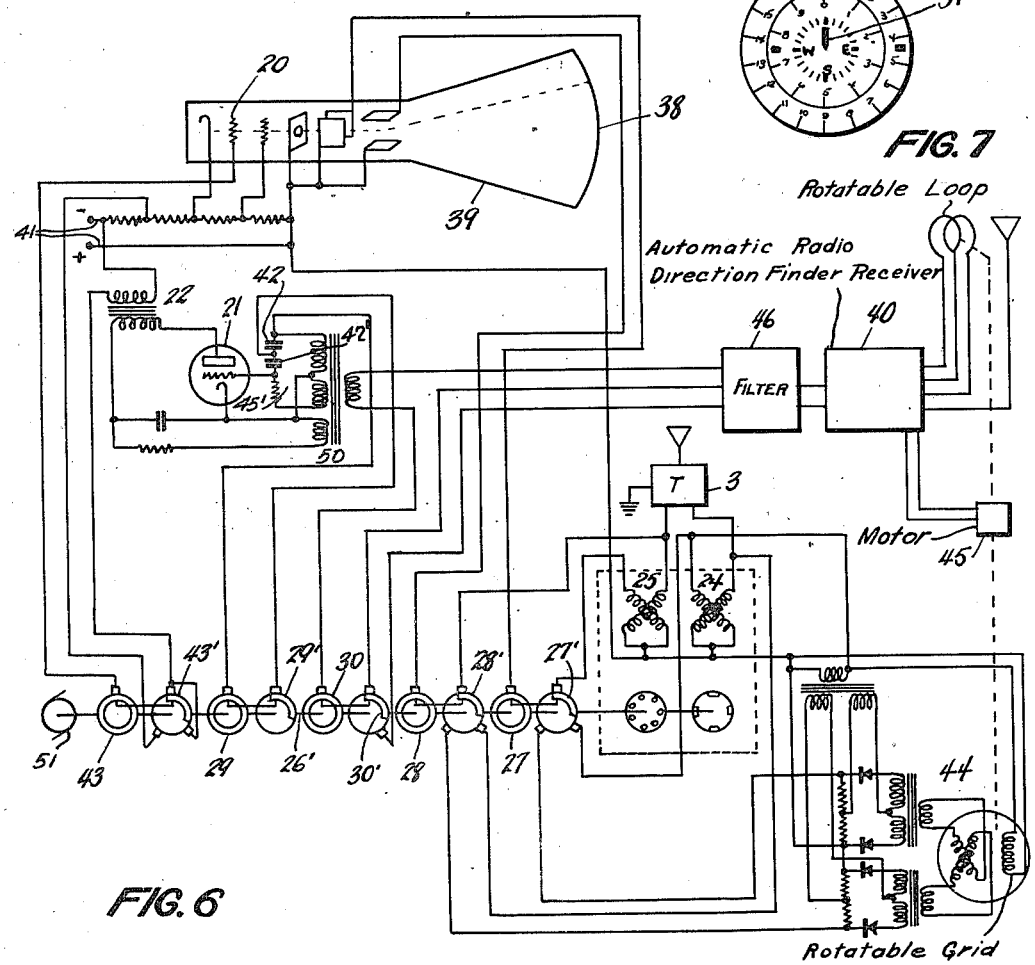
FIG. 6
FIG. 7
INVENTOR
ERIC J. ISBISTER,
BY
his ATTORNEY Patented Jan. 21, 1947

2,414,469

UNITED STATES PATENT OFFICE 2,414,469

DISTANCE AND DIRECTION MEASURING APPARATUS

Eric J. Isbister, Brooklyn, N. Y., assignor to Sperry Gyroscope Company, Inc., Brooklyn, N. Y., a corporation of New York Application March 8, 1940, Serial No. 322,956

7 Claims. (Cl. 250—1)

This invention relates generally to the determination of the distance and, in some instances, the direction of one object with respect to another object, and the invention has reference, more particularly, to a novel distance and direction measuring apparatus for accomplishing this result.

It is ofttimes desirable to know the absolute distance between two fixed or moving points and the direction of travel of any moving point. Thus, in the navigation of aircraft in the making of blind landings, it is desirable for the pilot to know the distance and direction of his craft from the landing runway. Also, in air and ship navigation, it is desirable to know the bearing and distance of objects or markers such as radio transmitting stations. It is also desirable to determine from the ground the location of aircraft. Also, in fire control work, it is desirable to use a long base line such as that provided by the distance between two naval ships, the distance between the ships and direction being determined by apparatus of the present invention, whereupon the location of the target can be readily determined by triangulation.

The principal object of the present invention is to provide novel distance and direction measuring apparatus that is suitable for accomplishing the above desired results, said apparatus employing radio means for transmitting signals between the objects and determining by the relative phase displacement of the transmitted and received signals the distance therebetween, the relative bearings of the objects being determined by radio direction finding means.

Another object of the present invention is to provide radio apparatus for transmitting a modulated carrier signal from one object, which signal is received at the other object and instantly re-transmitted and received at the first object, the received signal being compared in phase with the transmitting signal by use of suitable indicator means, to thereby indicate the relative phase displacement of the signals and hence the distance between the objects.

Another object of the invention is to provide means for shifting the phase of the transmitted signals continuously whereby the received signal is brought into phase with the transmitting signal, the amount of phase shift of the transmitted signal being an indication of the distance between the objects, which distance may be shown directly in miles or other units.

Still another object of the present invention lies in the provision of a novel distance measuring apparatus wherein different modulating frequencies are superimposed upon a carrier for transmission to the distant object, the return signal after reception being filtered and employed for providing two distance indications, one being an ordinary indication and the other being a micrometer indication, whereby miles and tenths of miles, for example, may be simultaneously indicated.

Other objects and advantages will become apparent from the specification, taken in connection with the accompanying drawings wherein the invention is embodied in concrete form.

In the drawings,

Fig. 2 is a wiring diagram of a practical form of my invention.

Fig. 3 illustrates apparatus employing two different modulating frequencies for providing a micrometer indication, i. e., improving the accuracy of the distance indication.

Fig. 4 is a typical instrument face suitable for the apparatus of Fig. 2.

Fig. 5 is a typical instrument face suitable for the apparatus of Fig. 3.

Fig. 6 is a wiring diagram illustrating the invention adapted not only for providing accurate distance measurement through use of a micrometer scale but also providing a direction indication.

Fig. 7 is a typical instrument face suitable for the apparatus of Fig. 6.

Figure 1:
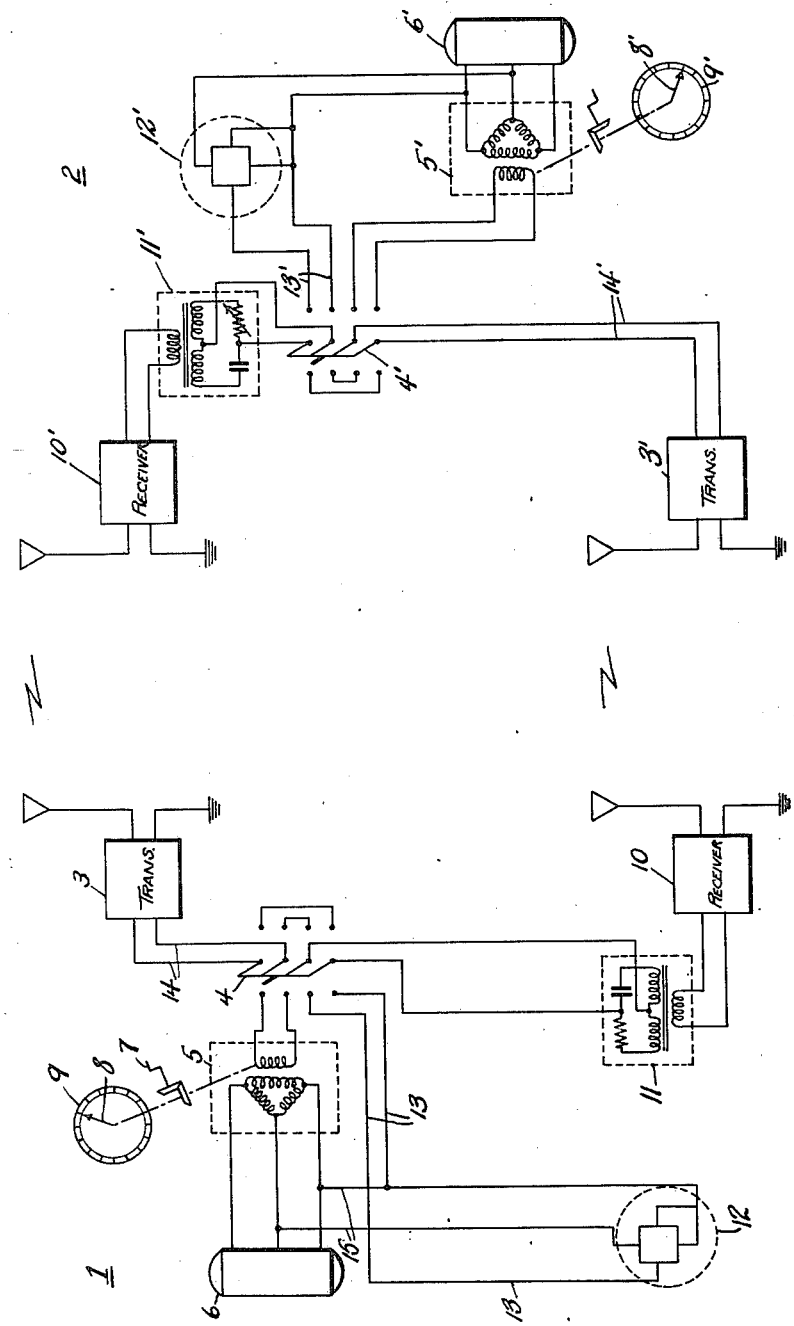
Fig. 1 is a schematic wiring diagram illustrating the system of the present invention.

Referring now to Fig. 1 of the drawings, radio apparatus designated as reference numeral 1 is provided at one object or location and similar radio apparatus designated by the reference numeral 2 is provided at the other object or location, the said radio apparatus serving to indicate the distance between the objects or locations. Apparatus 1 comprises a transmitter 3 adapted to be connected through the double-throw switch 4 to the single-phase winding of the phase shifter 5, the three-phase winding of which is supplied from a generator 6. A crank handle 7 is shown connected for turning the single-phase winding of phase shifter 5 to thereby shift the phase of the modulation supplied to the transmitter 3, and a pointer 8 is actuated with movements of the single-phase winding to indicate distance on a scale 9. A receiver 10 is provided for receiving the re-transmitted signals and feeds through a calibrator 11 and through the switch 4 and leads 13 to one pair of deflecting plates of a cathode ray type indicator 12. The other pair of deflecting plates of this indicator are connected to one phase of the three-phase output of generator 6.

Parts of the radio apparatus 2, located at the other object which are similar to parts just described, are similarly designated in the drawings but with primes applied to the corresponding reference numerals. In use, with both switches 4 and 4' thrown into their left-hand positions, the single-phase audio signal from the phase shifter 5 is supplied to the transmitter 3 through switch 4 and leads 14 and is then transmitted to the receiver 10' at the right-hand station 2. The demodulated signal at station 2 is passed through calibrator 11', switch 4' and leads 14 and is retransmitted on a different carrier frequency by the right-hand station transmitter 3'. This signal is received and demodulated by the receiver 10 of the station 1. The demodulated signal, passed through calibrator 11, switch 4 and leads 13, is compared at the cathode ray indicator 12 with the phase of the transmitted audio signal supplied over leads 15 to the cathode ray indicator 12. The transmitted and received signals will differ in phase by an amount proportional to the distance between the stations. The proportionality arises from the constant rate of propagation of the radio waves between the stations.

Obviously, if the stations 1 and 2 are immediately adjacent, there will be no phase displacement between the transmitted and received signals, so that these signals will be in phase and a straight line will be drawn upon the face of the cathode ray tube 12. If the received signal is 180° out of phase with the transmitted signal then the straight line will be rotated 90° from the first line mentioned, assuming, of course, that the voltage applied to one pair of plates is equal to that applied to the other two. If the received wave is 90° or 270° out of phase with the transmitted wave, a circle will be drawn. As the phase difference increases from zero, the straight line changes into an ellipse, becoming a circle at 90° phase displacement and then changing to an ellipse again and finally into a straight line at 180°.

In calibrating the system, the receiver 10 will be tuned to the same frequency as the transmitter 3 and the calibrator 11 adjusted so that the received and transmitted signals are in the same phase as indicated by 12. The same thing is done with respect to transmitter 3' and receiver 10'. In accomplishing this, switch 4 of station 1 must be in the left-hand position and switch 4' of station 2 in the right-hand position.

Now throwing switch 4' to the left-hand position, if the stations or objects are quite close together there will be a very small phase shift and as the distance between them increases, the phase shift will increase. In the apparatus shown in Fig. 1, it is necessary to turn the phase shifter handle 7 to bring the oscillograph pattern back to a straight line. The reading of the pointer 8 on the phase shifter dial 9 will directly indicate the distance in miles or other units used between the two stations or objects.

In the form of the invention illustrated in Fig. 2, the distance between the stations is automatically indicated on a cathode ray tube face. In this system, a two-phase generator 17 is employed, each phase winding of which is respectively connected to the respective pairs of plates of the cathode ray tube 18. Since these phase windings are 90° out of phase, the impression of their voltages upon the respective pairs of plates of tube 18 will cause this tube to draw a circle on a scale 19 when the tube is turned on. The cathode ray beam of the tube is normally blocked out by a negative bias provided on the control grid 20 supplied from leads 41. Signals sent out by transmitter 3 are received by receiver 10', retransmitted by transmitter 3' and received by receiver 10. The output of receiver 10 supplies a relaxation oscillator employing grid-glow or grid controlled gas rectifier tube 21. This oscillator passes current only at the peak of the output of receiver 10, which output, passing through transformer 22 raises the potential of control grid 20 and momentarily biases cathode ray tube 18 on, so that a spot appears on the face 19 at a point depending on the phase of the received signal. The timing of the pulse which puts tube 18 on, therefore, shifts with the phase of the received signal and the spot appearing on the face 19 will appear to rotate as the signal phase is shifted, one revolution of the spot being equal to the 360° of phase shift. The spot can therefore be caused to move over a scale 23 (see Fig. 4), calibrated directly in miles or other distance units.

In the apparatus of Fig. 3, two different frequency audio generators 24 and 25 shown as of the two-phase type are used. A winding of generator 24 and the corresponding winding of generator 25 are connected in series and to the transmitter 3 for modulating the carrier of this transmitter with two different audio frequencies. The windings of generators 24 and 25 are connected to the pairs of deflecting plates 31 and 33 of cathode ray tube 32 alternately in rapid succession by suitable commutating means. This comutating means is mounted on the common shaft 26 of generators 24 and 25 and consists of pairs of connected rings and segments, the rings being designated 27, 28, 29 and 30 and the connected segments being designated 27', 28', 29' and 30'.

Thus, as shaft 26 turns, corresponding windings of generators 24 and 25 are connected, by ring 27 and cooperating segment 27', alternately in rapid succession to one pair 31 of deflecting plates of the cathode ray indicator 32. Similarly, the 90° displaced windings of these generators are alternately and rapidly connected in sequence by ring 28 and segment 28' to the other pair of deflecting plates 33 of indicator 32.

Thus, if the cathode ray tube were turned on, two circles would appear on the face 34 of the tube one within the other. The relaxation oscillator 21 is employed as in Fig. 2, and the operation is similar to that of Fig. 2 except that two modulating frequencies are used instead of one, which modulating frequencies after demodulation and filtering by filter 46 are rapidly switched by ring 29 and segment 30' of the commutating means. Thus, assuming, for example, that generator 24 puts out a 1,000 cycle frequency and that generator 25 puts out a 100 cycle frequency then the carrier of the transmitter 3 will be modulated by these two frequencies. The receiver filter 46 will put out over lead 47 the 100 cycle frequency which is supplied through segment 30' during one-half revolution of motor 51, jumper lead 48 and ring 30 through lead 49 to transformer 50 connected to the phase shifting network 45' and from thence back to the filter 46. Similarly, the 1,000 cycle output of filter 46 passes over lead 52, segment 30' during the other half of each revolution of motor 51, jumper lead 48, lead 49 and the primary transformer 50 back to filter 46. Ring 29 and segment 29' alternately insert and remove condenser 42 from the grid control circuit of trigger tube 21 in synchronism with the alternate supply of the demodulated and filtered signals to the relaxation generator 21. In order that tube 21 shall fire only at the peak of the received demodulated signal, it is necessary that the phase of its grid voltage should lag that of its anode by approximately 90°. This is accomplished by the phase shifting circuit 45' including condensers 42 and 42'. The commutating arrangement is so disposed that while the higher modulation frequency is being supplied from filter 46 through segment 30' and ring 30 to tube 21, the segment 29' and ring 29 short the condenser 42, thereby reducing the capacity in the phase shift network to maintain a 90° shift between grid and plate. On the other hand, while the lower modulation frequency is being supplied from filter 46 through segment 30' and ring 30 to tube 21 the segment 29' and ring 29 are no longer connected so that condenser 42 is included in the phase shift network to compensate for the lower frequency. If one modulating frequency supplied by generator 24, for example, is ten times that supplied by generator 25, the phase of the signal received by receiver 10 due to the re-transmission of the modulation sent out from 24 will shift ten times as fast as the phase of the re-transmitted signal derived from generator 25. This will cause one spot on the cathode ray tube to revolve ten times as fast as the other. Thus, if one scale, such as scale 35 (see Fig. 5) is calibrated in miles, then the other scale 36 will be calibrated in tenths of miles, thereby enabling a micrometer or more accurate reading of distance, over a limited range, to be made on scale 36 than can be made on scale 35.

A frequency of 5,000 cycles per second will give 360° of phase shift in approximately 18 miles. For longer distances, lower modulation frequencies are used to make the readings non-ambiguous. Thus, it will be seen that frequencies considerably higher than the normal voice channels will be necessary, allowing normal conversation to be carried on through use of the radio transmitters and receivers at the same time that distance measurements are being made.

The apparatus of Figs. 6 and 7 is similar to that of Fig. 3 with the exception that means for indicating direction, namely, the line 37 is provided on the face 38 of the cathode ray tube 39. Commutation means are shown similar to that of Fig. 3, except that the segments are made shorter to accommodate additional brushes used for applying the rectified output of an electromagnetic pick-off 44, driven by the radio direction finder loop orienting motor 45 to the deflecting plates of the cathode ray tube 39 alternately with the voltages from the generators 24 and 25.

In Fig. 6 the automatic radio direction finder receiver is designated 40. This receiver may be of the type described in patent application, Ser. No. 101,274, Patent No. 2,262,003, granted Nov. 11, 1941 and other standard types. The output of the receiver 40 is filtered, commutated by ring 30 and segment 30' and applied to the oscillator generator 21 as in Fig. 3. The beam of the cathode ray tube is biased on at regular intervals to give the two distance indications as in Fig. 3. Also, a ring 43 and segment 43' serve to bias the beam on during the interval that the direction finder signal is applied to the deflecting plates of the cathode ray tube.

It will be noted that it is not necessary to have the modulating and cathode ray tube equipment at both stations, but this equipment may be only used in one station, if desired, as is used in Fig. 2. In this case, the other station has a receiver and a connected re-broadcasting transmitter. This is true of the structures shown in Figs. 3 and 6 also.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. Radio distance measuring apparatus comprising a pair of mutually separated stations having radio transmitters and receivers, a multi-phase generator at one of said stations connected for supplying a modulating frequency to the transmitter of that station, the receiver of said other station acting to receive said modulated carrier from the one station which is then re-transmitted by the transmitter of said other station, a cathode ray tube indicator at said one station having deflecting plates energized from said multi-phase generator whereby the cathode ray of said tube would produce a circle on the face thereof were the tube biased on, potential means for normally biasing said tube off, and a trigger circuit for momentarily biasing said cathode ray tube on to provide a distance indicator, said trigger circuit being energized from said one station receiver.

2. In a radio distance measuring apparatus, a station having a transmitter and a receiver, multi-phase generating means for modulating the carrier output of said transmitter with a plurality of frequencies, a cathode ray tube indicator having a plurality of pairs of deflecting plates, commutating means for alternately exciting each pair of deflecting plates of said cathode ray tube with the output of a respective phase of said generating means, means for normally biasing the cathode ray of said cathode ray tube off, a relaxation oscillator for momentarily biasing said cathode ray on, said commutating means serving to alternately apply the respective demodulated outputs of said receiver to said relaxation oscillator to effect momentary operation of said cathode ray tube synchronously with the application of voltages to the deflecting plates thereof, whereby both a coarse indication and a micrometer indication of distance between the station and a remote station is provided on said cathode ray tube face so that the distance between the stations is accurately indicated.

3. A radio distance measuring apparatus as defined in claim 2 wherein said multi-phase generating means comprises two, two-phase generators, said commutating means serving to connect corresponding windings of said generators alternately in rapid succession to one pair of deflecting plates of said cathode ray tube, the remaining corresponding windings of said generators being alternately and rapidly connected in sequence to the other pair of deflecting plates of said cathode ray tube by said commutating means.

4. A radio distance measuring apparatus as defined in claim 2 wherein said relaxation oscillator is provided with a control circuit having a capacity therein that is connected to said commutating means, said commutating means serving to vary said capacity synchronously with the application of demodulated signals to said oscillator.

5. Radio distance and direction measuring apparatus comprising a plurality of stations having radio transmitters and receivers, the receiver of one of said stations being of the automatic direction finder type, a cathode ray tube indicator, generating means for supplying the transmitter of said one station with a modulating frequency, said automatic direction finder receiver having an automatically oriented directional antenna, pick-off means actuated synchronously with said antenna, commutating means for supplying the deflecting plates of said cathode ray tube indicator with said modulating frequency and the rectified output of said pick-off means alternately, the receiver of said other station acting to receive said modulated carrier from the one station which is then re-transmitted by the transmitter of said other station, said commutating means serving to utilize the output of said receiver of said one station to intermittently put said cathode ray tube on to indicate the distance between said stations, said commutating means acting to also intermittently put the cathode ray tube on to cause the same to give a direction indication depending on the output of said pick-off means.

6. Radio distance and direction measuring apparatus comprising a plurality of stations each having a transmitter and receiver, means at one of said stations for modulating a continuously transmitted carrier, the receiver of said other station acting to receive said modulating carrier from the one station which is then re-transmitted by the transmitter of said other station, directional and non-directional antenna means for supplying the receiver of one of said stations, motor means for rotating said directional antenna means to maintain the same parallel to a wave front of electro-magnetic radiation emitted from the other station, an electromagnetic pick-off operating from said motor means, means for rectifying the output of said pick-off; a cathode ray tube indicator, means for normally biasing the cathode ray of said indicator off, a relaxation oscillator for momentarily biasing the cathode ray of said tube on, generating means for supplying modulating frequencies to said transmitter, commutating means for intermittently exciting each pair of deflecting plates of said cathode ray tube with the output of a respective phase of said generating means, said commutating means also serving to intermittently supply the rectified output of said electromagnetic pick-off to said cathode ray tube deflecting plates, said commutating means serving to alternately supply the different frequency demodulated outputs of said receiver to said relaxation oscillator, said commutating means also acting to bias said cathode ray tube on for the periods that the rectified output of said electromagnetic pick-off is applied to the deflecting plates of said tube, whereby said tube not only gives coarse and fine distance indications but also indicates direction of the other station.

7. Radio distance measuring apparatus comprising a plurality of stations, each of said stations having radio transmitting and receiving apparatus, means at one of said stations for modulating a continuously transmitted carrier, the receiver of said other station acting to receive said modulated carrier from the one station which is then re-transmitted by the transmitter of said other station, said one station having means for comparing the phase of the transmitted signal with that of the received re-transmitted signal to provide a distance indication, said last-named means comprising a cathode ray tube indicator, potential means connected for normally biasing said cathode ray tube off, and a relaxation oscillator controlled from the receiver of said one station connected for momentarily overcoming said potential means and acting to bias said cathode ray tube on to give a spot indication on the cathode ray tube face corresponding to the distance between the stations.

ERIC J. ISBISTER.